US011959580B2

(12) United States Patent
Suzuki et al.

(10) Patent No.: US 11,959,580 B2
(45) Date of Patent: Apr. 16, 2024

(54) FUEL PIPE AND FUEL CONVEYANCE METHOD USING SAME

(71) Applicant: KURARAY CO., LTD., Okayama (JP)

(72) Inventors: Makoto Suzuki, Kurashiki (JP); Wout Luyten, Melsele (BE); Hiroyuki Shimo, Melsele (BE)

(73) Assignee: KURARAY CO., LTD., Okayama (JP)

( * ) Notice: Subject to any disclaimer, the term of this patent is extended or adjusted under 35 U.S.C. 154(b) by 491 days.

(21) Appl. No.: 17/413,388

(22) PCT Filed: Dec. 13, 2019

(86) PCT No.: PCT/JP2019/048886
§ 371 (c)(1),
(2) Date: Jun. 11, 2021

(87) PCT Pub. No.: WO2020/122226
PCT Pub. Date: Jun. 18, 2020

(65) Prior Publication Data
US 2022/0074524 A1    Mar. 10, 2022

(30) Foreign Application Priority Data

Dec. 14, 2018   (JP) ................. 2018-234111

(51) Int. Cl.
| *F16L 9/12* | (2006.01) |
| *B32B 1/08* | (2006.01) |
| *B32B 7/12* | (2006.01) |
| *B32B 27/08* | (2006.01) |
| *B32B 27/20* | (2006.01) |
| *B32B 27/30* | (2006.01) |
| *B32B 27/32* | (2006.01) |
| *F16L 1/028* | (2006.01) |

(52) U.S. Cl.
CPC ............... *F16L 9/121* (2013.01); *B32B 1/08* (2013.01); *B32B 7/12* (2013.01); *B32B 27/08* (2013.01); *B32B 27/20* (2013.01); *B32B 27/306* (2013.01); *B32B 27/32* (2013.01); *F16L 1/028* (2013.01); *B32B 2250/03* (2013.01); *B32B 2250/24* (2013.01); *B32B 2264/02* (2013.01); *B32B 2264/302* (2020.08); *B32B 2264/303* (2020.08); *B32B 2270/00* (2013.01); *B32B 2307/308* (2013.01); *B32B 2307/7265* (2013.01); *B32B 2307/732* (2013.01); *B32B 2597/00* (2013.01)

(58) Field of Classification Search
CPC ............... F16L 9/121; F16L 2011/047; Y10T 428/1393; Y10S 138/07

USPC .... 138/140, 137, 141; 428/36.6, 36.7, 36.91
See application file for complete search history.

(56) References Cited

U.S. PATENT DOCUMENTS

| 5,469,892 A | * | 11/1995 | Noone ................. B29C 48/335 138/121 |
| 5,566,720 A | * | 10/1996 | Cheney .................. F16L 9/121 138/140 |
| 5,576,101 A | * | 11/1996 | Saitoh .................... B32B 27/08 428/476.3 |
| 5,678,611 A | * | 10/1997 | Noone ................. F16L 11/127 138/140 |
| 6,203,868 B1 | * | 3/2001 | Bonk ..................... B29C 48/08 428/521 |
| 6,555,243 B2 | * | 4/2003 | Flepp ..................... B32B 27/30 264/513 |
| 2002/0172788 A1 | | 11/2002 | Chan et al. |
| 2003/0087053 A1 | * | 5/2003 | Fukushi ................. F16L 11/04 428/421 |
| 2004/0076780 A1 | * | 4/2004 | Chan ....................... B05D 1/10 428/35.7 |
| 2006/0127621 A1 | * | 6/2006 | Sato ...................... F16L 11/045 428/36.91 |
| 2008/0124523 A1 | * | 5/2008 | Nohara .............. C09J 123/0846 428/688 |
| 2009/0123683 A1 | * | 5/2009 | Miller ..................... B32B 5/026 264/171.27 |
| 2012/0301652 A1 | * | 11/2012 | Kawaguchi ............. C08L 23/16 428/476.3 |
| 2016/0168370 A1 | * | 6/2016 | Sato ........................ C08L 77/06 428/36.6 |

FOREIGN PATENT DOCUMENTS

| CN | 101280865 A | 10/2008 |
| CN | 202733206 U | 2/2013 |
| CN | 103372505 A | 10/2013 |
| DE | 19608318 A1 | 8/1997 |
| JP | H10-24505 A | 1/1998 |
| JP | 2002-096016 A | 4/2002 |
| JP | 2006-062734 A | 3/2006 |

OTHER PUBLICATIONS

Office Action issued in corresponding Chinese Patent Application No. 201980082565.X dated Apr. 21, 2022.
International Search Report issued in corresponding International Patent Application No. PCT/JP2019/048886 dated Feb. 25, 2020.

* cited by examiner

*Primary Examiner* — Patrick F Brinson
(74) *Attorney, Agent, or Firm* — Morgan, Lewis & Bockius LLP

(57) ABSTRACT

The present disclosure provides a fuel pipe having a double tube with an inner tube and an outer tube disposed on the outside of the inner tube.

12 Claims, No Drawings

FUEL PIPE AND FUEL CONVEYANCE METHOD USING SAME

TECHNICAL FIELD

The present invention relates to a fuel pipe comprising a double tube and a method for transporting fuel therewith.

BACKGROUND ART

Conventionally steel pipes have been used as fuel pipes buried in the ground in a gas station or the like. However, a corroded steel pipe buried in the ground causes fuel leakage. Furthermore, a steel pipe is heavy, leading to poor workability during pipe installation or the like. Alternatively, a fuel pipe made of a resin having a Nylon barrier layer is known. However, Nylon has poor fuel barrier properties, so that fuel such as gasoline may be transpired from the pipe, causing soil pollution.

An ethylene-vinyl alcohol copolymer (hereinafter, sometimes abbreviated as "EVOH") is excellent in gas barrier properties, aroma retentivity, solvent resistance, oil resistance, transparency and the like, and making use of the properties, it has been widely used as a barrier layer in a packaging material for foods and drugs and a container or pipe for fuel or water, and the like.

Patent Reference No. 1 has described a fuel oil pipe buried in the ground in an oil station, wherein a shielding layer made an ethylene-vinyl alcohol copolymer is adhered via an adhesive layer made of a modified polyethylene to the inside of an outer layer made of a polyethylene resin. The pipe, however, has insufficient fuel barrier properties. In particular, when the pipe is deformed in a direction vertical to an axis by a load from the ground during burying the pipe in the ground, fuel barrier properties are remarkably deteriorated.

Patent Reference No. 2 has described a fuel pipe comprised of a multilayer structure having a resin composition layer containing EVOH and resin fine particles having a core-shell structure, as a barrier layer. It has described that the fuel pipe is excellent in gasoline barrier properties and impact resistance. However, when the fuel pipe is deformed in a direction vertical to a longitudinal direction (fuel flow direction), fuel barrier properties are remarkably deteriorated. Patent Reference No. 2 has not described burying a fuel pipe in the ground at all.

PRIOR ART REFERENCES

Patent References

Patent Reference No. 1: JP 2006-62734A
Patent Reference No. 2: JP 1998-24505A

SUMMARY OF THE INVENTION

Problems to be Solved by the Invention

To solve the above problems, an objective of the present invention is to provide a fuel pipe which exhibits high flattening strength and prevents deterioration in fuel barrier properties even when the pipe is deformed in a direction vertical to a longitudinal direction (fuel flow direction). Another objective of the present invention is to provide a method whereby fuel can be safely transported without fuel leakage.

Means for Solving the Problems

The above problems can be solved by providing a fuel pipe comprising a double tube comprising an inner tube and an outer tube disposed on the outside of the inner tube, wherein the inner tube comprises a layer made of a resin composition containing an EVOH (A) and an elastomer (B), and a layer made of a polyethylene; the outer tube comprises a layer made of a polyethylene; a thickness of the inner tube is 5 mm or more, and a ratio of a thickness of the layer made of the resin composition to a thickness of the inner tube (resin composition layer/inner tube) is 0.02 to 0.2; and a ratio of a thickness of the outer tube to a thickness of the inner tube (outer tube/inner tube) is 0.1 to 5.

It is preferable that the elastomer (B) is at least one selected from the group consisting of an acrylic elastomer, an olefinic elastomer, a urethane elastomer, a styrenic elastomer and a conjugated-diene elastomer.

It is also preferable that the resin composition comprises multilayer structured polymer particles as the elastomer (B). Here, it is preferable that an average primary particle size of the multilayer structured polymer particles is 0.2 to 1 µm. It is also preferable that an average secondary particle size of the multilayer structured polymer particles is 1.1 to 10 µm.

It is preferable that the multilayer structured polymer particles have at least an outermost layer and an innermost layer. Furthermore, it is more preferable that a glass transition temperature of a polymer component constituting the outermost layer is 30° C. or higher, and a glass transition temperature of a polymer component constituting the innermost layer is −10° C. or lower.

It is preferable that an ethylene content of the EVOH (A) is 20 to 50 mol %. It is also preferable that a mass ratio (B/A) of the elastomer (B) to the EVOH (A) is 1/99 to 40/60.

The above problems can be solved by providing a method for transporting fuel using the fuel pipe as described above.

A preferable embodiment of the present invention is a fuel pipe for underground burial consisting of the fuel pipe as described above.

The above problems can be solved by providing a method for transporting fuel, comprising burying the fuel pipe as described above in the ground, and then transporting fuel using the fuel pipe.

Effects of the Invention

A fuel pipe of the present invention exhibits high flattening strength and prevents deterioration in fuel barrier properties even when the pipe is deformed in a direction vertical to a longitudinal direction (fuel flow direction). Furthermore, a fuel pipe of the present invention formed without any steel is light weighted and can be thus installed with a high work efficiency. A fuel can be safely transported by transporting the fuel using the fuel pipe of the present invention, particularly by burying the fuel pipe in the ground and then transporting the fuel using the pipe, and an installation cost can be reduced.

MODES FOR CARRYING OUT THE INVENTION

A fuel pipe of the present invention is a fuel pipe comprising a double tube comprising an inner tube and an outer tube disposed on the outside of the inner tube, wherein the inner tube comprises a layer made of a resin composition containing an EVOH (A) and an elastomer (B), and a layer made of a polyethylene; the outer tube comprises a layer made of a polyethylene; a thickness of the inner tube is 5 mm or more, and a ratio of a thickness of the layer made of the resin composition to a thickness of the inner tube (resin composition layer/inner tube) is 0.02 to 0.2; and a ratio of a thickness of the outer tube to a thickness of the inner tube (outer tube/inner tube) is 0.1 to 5.

(Inner Tube)

An inner tube used for a fuel pipe of the present invention consists of a multilayer structure comprising a layer made of a resin composition containing an EVOH(A) and an elastomer (B) (hereinafter, sometimes abbreviated as a "resin composition layer") and a layer made of a polyethylene (hereinafter, sometimes abbreviated as a "polyethylene layer"). In the present invention, it is essential that the inner tube has a resin composition layer as a barrier layer. With the inner tube having the resin composition layer, fuel barrier properties are improved and deterioration of fuel barrier properties can be reduced even when the fuel pipe is deformed in a direction vertical to a longitudinal direction (fuel flow direction).

(EVOH (A))

An EVOH (A) used in the present invention is a copolymer having ethylene units and vinyl alcohol units. An EVOH (A) is generally produced by saponifying an ethylene-vinyl ester copolymer. An ethylene-vinyl ester copolymer can be produced and saponified by known methods. Examples of a vinyl ester used for producing an ethylene-vinyl ester copolymer include aliphatic acid vinyl esters such as vinyl formate, vinyl acetate, vinyl propionate, vinyl valerate, vinyl caprate, vinyl laurate, vinyl stearate, vinyl pivalate and vinyl versatate, and among these, vinyl acetate is preferable.

A content of ethylene units in an EVOH (A) is preferably 20 mol % or more, more preferably 25 mol % or more. If a content of ethylene units is less than 20 mol %, thermal stability and flexibility of the EVOH (A) may be deteriorated, so that when a fuel pipe is deformed, fuel barrier properties may be deteriorated. A content of ethylene units in an EVOH (A) is preferably 50 mol % or less, more preferably 35 mol % or less. If a content of ethylene units in an EVOH (A) is more than 50 mol %, fuel barrier properties may be deteriorated. A content of ethylene units and a saponification degree of an EVOH (A) can be determined by nuclear magnetic resonance (NMR) spectrometry.

A saponification degree of an EVOH (A) is preferably 90 mol % or more, more preferably 95 mol % or more, further preferably 99 mol % or more. When a saponification degree of an EVOH (A) is 90 mol % or more, fuel barrier properties, thermal stability and moisture resistance of a fuel pipe produced are further improved. A saponification degree of an EVOH (A) is generally 99.97 mol % or less, preferably 99.94 mol % or less.

As long as achievement of the objectives of the present invention is not impaired, an EVOH (A) can further contain units derived from another monomer other than ethylene, a vinyl ester and a saponified product thereof. A content of units derived from the other monomer in an EVOH (A) is preferably 30 mol % or less, more preferably 20 mol % or less, further preferably 10 mol % or less, particularly preferably 5 mol % or less, based on the total monomer units in the EVOH (A). When an EVOH (A) contains units derived from another monomer, a content thereof is preferably 0.05 mol % or more, more preferably 0.10 mol % or more, based on the total monomer units in the EVOH (A). Examples of the other monomer include unsaturated acids or anhydrides, salts or mono- or dialkyl esters thereof such as acrylic acid, methacrylic acid, crotonic acid and itaconic acid; nitriles such as acrylonitrile and methacrylonitrile; amides such as acrylamide and methacrylamide; olefin sulfonic acids or salts thereof such as vinylsulfonic acid, allylsulfonic acid and methallylsulfonic acid; vinylsilane compounds such as vinyltrimethoxysilane, vinyltriethoxysilane, vinyltri(β-methoxy-ethoxy)silane and γ-methacryloxypropylmethoxysilane; alkyl vinyl ethers; vinyl ketone; N-vinylpyrrolidone; vinyl chloride; and vinylidene chloride.

An MFR (melt flow rate) (measured under the load of 2160 g at 190° C.) of an EVOH (A) is suitably 0.1 to 100 g/10 min. If an MFR of an EVOH (A) is more than 100 g/10 min, strength of a resin composition layer may be deteriorated. An MFR of an EVOH (A) is more suitably 50 g/10 min or less, further suitably 30 g/10 min or less. If an MFR of an EVOH (A) is less than 0.1 g/10 min, melt molding may be difficult. An MFR of an EVOH (A) is more suitably 0.5 g/10 min or more.

An EVOH (A) can be used alone or in combination of two or more.

(Elastomer (B))

A resin composition layer contains an elastomer (B). It allows for preventing deterioration of fuel barrier properties even when a fuel pipe is deformed in a direction vertical to a longitudinal direction (fuel flow direction). Examples of an elastomer (B) include acrylic elastomers; olefinic elastomers such as ethylene-butene copolymers and ethylene-propylene copolymers; urethane elastomers; styrenic elastomers such as styrene-ethylene/butylene-styrene block copolymers (SEBS), styrene-isobutylene-styrene block copolymers (SIBS), styrene-ethylene/propylene-styrene block copolymers (SEPS), styrene-butadiene-styrene block copolymers (SBS) and styrene-isoprene-styrene block copolymers (SIS); conjugated-diene elastomers such as styrene-butadiene copolymers, acrylonitrile-butadiene copolymers, acrylic acid ester-butadiene copolymers and hydrogenated products thereof; silicone elastomers such as polyorganosiloxanes; ethylenic ionomer copolymers; polybutadienes; polyisoprenes; butadiene-isoprene copolymers; polychloroprenes; or multilayer structured polymer particles containing the above component in an innermost layer. These can be used alone or in combination of two or more. Among these, an elastomer (B) is preferably at least one selected from the group consisting of acrylic elastomers, olefinic elastomers, urethane elastomers, styrenic elastomers and conjugated-diene elastomers, more preferably an acrylic elastomer or a conjugated-diene elastomer.

An acrylic elastomer is produced by polymerizing an acrylic acid ester. Examples of an acrylic acid ester used for synthesis of the acrylic elastomer include acrylic acid alkyl esters such as methyl acrylate, ethyl acrylate, propyl acrylate, butyl acrylate, 2-ethylhexyl acrylate, and octyl acrylate. Among these, the elastomer is produced by polymerizing butyl acrylate or ethyl acrylate.

In synthesizing an acrylic elastomer, if necessary, another monofunctional polymerizable monomer other than an acrylic acid ester can be copolymerized. Examples of another monofunctional polymerizable monomer to be copolymerized include methacrylic acid esters such as methyl methacrylate, ethyl methacrylate, propyl methacrylate, butyl methacrylate, amyl methacrylate, hexyl methacrylate, 2-ethylhexyl methacrylate, cyclohexyl methacrylate, octyl methacrylate, decyl methacrylate, dodecyl methacrylate, octadecyl methacrylate, phenyl methacrylate, benzyl methacrylate, naphthyl methacrylate and isobornyl methacrylate; aromatic vinyl compounds such as styrene and α-methylstyrene; and acrylonitrile. A content of the other monofunctional monomer units based on the total monomer units in the acrylic elastomer is preferably 20% by mass or less.

In producing a conjugated-diene elastomer, if necessary, another monofunctional polymerizable monomer other than a conjugated diene can be copolymerized. Examples of another monofunctional polymerizable monomer to be copolymerized include those described as another monofunctional polymerizable monomer to be copolymerized with an acrylic acid ester in producing an acrylic elastomer. A content of the other monofunctional monomer units based on the total monomer units in the conjugated-diene elastomer is preferably 20% by mass or less.

A resin composition preferably contains multilayer structured polymer particles as an elastomer (B). The multilayer structured polymer particles more preferably have at least an outermost layer and an innermost layer. An elastomer (B) contained as such multilayer structure particles in a resin composition can further prevent deterioration of fuel barrier properties when a fuel pipe is deformed in a direction vertical to a longitudinal direction.

When a resin composition contains multilayer structured polymer particles as an elastomer (B), the elastomer (B) preferably has a crosslinked molecular chain structure for expressing rubber elasticity, and it is preferable that a molecular chain of a polymer component constituting an innermost layer is grafted with a molecular chain in a layer adjacent to the innermost layer by a chemical bond. To that end, in polymerization of a monomer for forming a polymer component constituting the innermost layer, it is sometimes preferable that a small amount of a multifunctional polymerizable monomer is combined as a crosslinking agent or a grafting agent.

A multifunctional polymerizable monomer used for forming a polymer component constituting an innermost layer is a monomer having two or more intramolecular carbon-carbon double bonds, including esters of an unsaturated carboxylic acid such as acrylic acid, methacrylic acid and cinnamic acid with an unsaturated alcohol such as allyl alcohol and methallyl alcohol or a glycol such as ethylene glycol and butanediol; and esters of a dicarboxylic acid such as phthalic acid, terephthalic acid, isophthalic acid and maleic acid with an unsaturated alcohol. Specific examples include allyl acrylate, methallyl acrylate, allyl methacrylate, methallyl methacrylate, allyl cinnamate, methallyl cinnamate, diallyl maleate, diallyl phthalate, diallyl terephthalate, diallyl isophthalate, divinylbenzene, ethylene glycol di(meth)acrylate, butanediol di(meth)acrylate, and hexanediol di(meth)acrylate. The term, "di(meth)acrylate" means a collective term of "diacrylate" and "dimethacrylate". These can be used alone or in combination with two or more. Among these, allyl methacrylate is suitably used.

A content of multifunctional polymerizable monomer units based on the total monomer units in a polymer component constituting an innermost layer is preferably 10% by mass or less. If a content of multifunctional polymerizable monomer units is too large, elastomer performance may be so deteriorated that when a fuel pipe is deformed, fuel barrier properties may tend to be deteriorated. When a monomer containing a conjugated-diene compound as a main component is used, the monomer itself functions as a crosslinking or graft point, and therefore, a multifunctional polymerizable monomer is not necessarily combined.

In the light of further preventing deterioration of fuel barrier properties due to deformation of a fuel pipe, it is preferable that a glass transition temperature (hereinafter, sometimes abbreviated as "Tg") of a polymer component constituting an innermost layer is −10° C. or lower.

It is also preferable that a Tg of a polymer component constituting an outermost layer of multilayer structured polymer particles is 30° C. or higher.

Examples of a radically polymerizable monomer used for synthesizing a polymer component constituting an outermost layer include alkyl methacrylates such as methyl methacrylate, ethyl methacrylate, propyl methacrylate and butyl methacrylate; methacrylic acid esters having an alicyclic skeleton such as cyclohexyl methacrylate, isobornyl methacrylate and adamantyl methacrylate; methacrylic acid esters having an aromatic ring such as phenyl methacrylate; aromatic vinyl compounds such as styrene and α-methylstyrene; and acrylonitrile. These monomers can be used alone or in combination of two or more. Examples of a preferable radically polymerizable monomer include methyl methacrylate or styrene alone, or a combination of two or more radically polymerizable monomers containing methyl methacrylate or styrene as a main component.

Multilayer structured polymer particles can be comprised of two or more layers, whose layer structure can be, for example, as follows.

Two-layer structure: innermost layer/outermost layer
Three-layer structure: innermost layer/intermediate layer/outermost layer Multilayer structured polymer particles preferably have at least one functional group having reactivity or affinity to a hydroxy group. This allows for improving dispersibility of multilayer structured polymer particles in an EVOH (A) matrix in a resin composition obtained, and further preventing deterioration of fuel barrier properties due to deformation of a fuel pipe. Such multilayer structured polymer particles can be produced by using a polymerizable compound having a functional group having reactivity or affinity to a hydroxy group as a moiety of a monomer in a polymerization reaction for producing the particles. Here, the functional group can be protected by a protecting group which is removed during mixing an EVOH (A) and multilayer structured polymer particles as long as achievement of the objectives of the present invention is not impaired.

A radically polymerizable compound having a functional group having reactivity or affinity to a hydroxy group is, for example, an unsaturated compound having a functional group capable of forming an intermolecular bond such as a chemical bond or hydrogen bond via a reaction with a hydroxy group in an EVOH (A) during mixing the EVOH (A) and multilayer structured polymer particles. Examples of a functional group having reactivity or affinity to a hydroxy group include a hydroxy group, an epoxy group, an isocyanate group (—NCO), an acid group such as a carboxyl group, and an acid anhydride such as maleic anhydride.

Examples of the unsaturated compound described above include polymerizable compounds having a hydroxy group such as 2-hydroxyethyl (meth)acrylate, 3-hydroxypropyl (meth)acrylate, 2-hydroxyethyl crotonate, 3-hydroxy-1-propene, 4-hydroxy-1-butene, cis-4-hydroxy-2-butene and trans-4-hydroxy-2-butene; epoxy-containing polymerizable compounds such as glycidyl (meth)acrylate, allyl glycidyl ether, 3,4-epoxybutene, 4,5-epoxypentyl (meth)acrylate, 10,11-epoxyundecyl methacrylate and p-glycidylstyrene; and carboxylic acids such as (meth)acrylic acid, crotonic acid, cinnamic acid, itaconic acid, maleic acid, citraconic acid, aconitic acid, mesaconic acid and methylenemalonic acid. The term, "di(meth)acrylate" means a collective term of "diacrylate" and "dimethacrylate", and "(meth)acrylic acid means a collective term of "acrylic acid" and "methacrylic acid".

The used amount of a radically polymerizable compound having a functional group having reactivity or affinity to a hydroxy group is preferably 0.01 to 75% by mass, more preferably 0.1 to 40% by mass based on the total monomers used for producing multilayer structured polymer particles. An example of a radically polymerizable compound having a protected functional group is t-butyl methacryl carbamate.

As long as a functional group can substantially react a hydroxy group in an EVOH (A) or form an intermolecular bond, the functional group can be present in any layer in multilayer structured polymer particles. Some of multilayer structured polymer particles in a resin composition can form a chemical bond with an EVOH (A), and particularly preferably, a functional group having reactivity or affinity to a hydroxy group is present in a molecular chain in an outermost layer.

A content of a polymer component constituting an innermost layer in multilayer structured polymer particles is preferably 50 to 90% by mass. If a content of a polymer component constituting an innermost layer is less than 50% by mass, fuel barrier properties may be significantly deteriorated when a fuel pipe is deformed. If a content of a polymer component constituting an innermost layer is more than 90% by mass, handleability of multilayer structured polymer particles may be deteriorated.

An average primary particle size of multilayer structured polymer particles is preferably 0.2 to 5 µm. If an average primary particle size of multilayer structured polymer particles is less than 0.2 µm, when an EVOH resin is dry-blended with multilayer structured polymer particles followed by melt extrusion to provide resin composition pellets, an average secondary particle size of multilayer structured polymer particles in the pellets tends to be too large. Here, secondary particles denote particles formed by agglomeration of primary particles, and if an average secondary particle size is too large, fuel barrier properties may be significantly deteriorated when a fuel pipe is deformed. An average primary particle size is preferably 0.3 µm or more, more preferably 0.35 µm or more. Again, if an average primary particle size is more than 5 µm, fuel barrier properties may be significantly deteriorated when a fuel pipe is deformed. An average primary particle size is more preferably 3 µm or less, further preferably 1 µm or less, particularly preferably 0.8 µm or less, most preferably 0.6 µm or less.

An average secondary particle size of multilayer structured polymer particles in a resin composition is preferably 1.1 to 10 µm. Thus, aggregates of relatively smaller multilayer structured polymer particles in a resin composition are formed, so that deterioration of fuel barrier properties due to deformation of a fuel pipe can be further prevented. An average secondary particle size is more preferably 1.5 µm or more, further preferably 2 µm or more. Meanwhile, an average secondary particle size is more preferably 8 µm or less, further preferably 6 µm or less, particularly preferably 5 µm or less. An average secondary particle size of multilayer structured polymer particles can be adjusted within a predetermined range, for example, by setting a screw rotation speed at 20 rpm or more during dry blending.

There are no particular restrictions to a polymerization method for producing multilayer structured polymer particles; for example, spherical multilayer structured polymer particles can be easily produced by common emulsion polymerization. Emulsion polymerization can be conducted in accordance with means generally employed by a person skilled in the art, and if necessary, a chain transfer agent such as octyl mercaptan and lauryl mercaptan can be used. After emulsion polymerization, multilayer structured polymer particles are separated from a copolymer latex and obtained in accordance with a method generally employed by a person skilled in the art (for example, coagulation, drying and the like).

(Resin Composition)

In a resin composition, a mass ratio (B/A) of an elastomer (B) to an EVOH (A) is preferably within a range of 1/99 to 40/60. If a mass ratio (B/A) is 1/99 or more, deterioration of fuel barrier properties due to deformation of fuel pipe is further prevented. A mass ratio (B/A) is more preferably 3/97 or more, further preferably 5/95 or more. If a mass ratio (B/A) is 40/60 or less, fuel barrier properties are further improved. A mass ratio (B/A) is more preferably 30/70 or less, further preferably 25/75 or less.

In a resin composition, a total content of an EVOH (A) and an elastomer (B) is preferably 50% by mass or more, more preferably 70% by mass or more, further preferably 80% by mass or more, particularly preferably 90% by mass or more.

(Antioxidant (C))

A resin composition preferably contains an antioxidant (C). A melting point of an antioxidant (C) is, for example, preferably 170° C. or less. If a melting point of an antioxidant (C) is higher than 170° C., when a resin composition is prepared by melt mixing, the antioxidant (C) may be not molten and localized in the resin composition, resulting in coloring of a high concentration part.

A molecular weight of an antioxidant (C) is preferably 300 or more. If a molecular weight of an antioxidant (C) is less than 300, the antioxidant (C) may bleed out on the surface of a fuel pipe obtained, leading to deterioration of thermal stability of a resin composition. A molecular weight of an antioxidant (C) is preferably 400 or more, further preferably 500 or more. The upper limit of a molecular weight of an antioxidant (C) is preferably 8000 or less, more preferably 6000 or less, further preferably 4000 or less, for example, in the light of dispersibility.

An antioxidant (C) is suitably a compound having a hindered phenol group. A compound having a hindered phenol group itself is excellent in thermal stability and is capable of capturing oxygen radicals which cause oxidation degradation. Thus, when being added as an antioxidant (C) to a resin composition, it is highly effective for preventing oxidation degradation.

A compound having a hindered phenol group can be selected from commercially available compounds, including the following products.

(1) BASF, "IRGANOX 1010": melting point: 110 to 125° C., molecular weight: 1178, pentaerythritol tetrakis[3-(3,5-di-tert-butyl-4-hydroxyphenyl)propionate]

(2) BASF, "IRGANOX 1076": melting point: 50 to 55° C., molecular weight: 531, octadecyl-3-(3,5-di-tert-butyl-4-hydroxyphenyl)propionate (3) BASF, "IRGANOX 1098": melting point: 156 to 161° C., molecular weight: 637, N,N'-hexane-1,6-diyl bis[3-(3,5-di-tert-butyl-4-hydroxyphenyl)propionamide]

(4) BASF, "IRGANOX 245": melting point: 76 to 79° C., molecular weight: 587, triethylene glycol-bis[3-(3-tert-butyl-5-methyl-4-hydroxyphenyl)propionate]

(5) BASF, "IRGANOX 259": melting point: 104 to 108° C., molecular weight: 639, 1,6-hexanediol-bis[3-(3,5-di-tert-butyl-4-hydroxyphenyl)propionate]

(6) Sumitomo Chemical Industry Company Limited, "Sumilizer MDP-s": melting point: about 128° C., molecular weight: 341, 2,2'-methylene-bis(4-methyl-6-tert-butylphenol)

(7) Sumitomo Chemical Industry Company Limited, "Sumilizer GM": melting point: about 128° C., molecular weight: 395, 2-tert-butyl-6-(3-tert-butyl-2-hydroxy-5-methylbenzyl)-4-methylphenyl acrylate (8) Sumitomo Chemical Industry Company Limited, "Sumilizer GA-80": melting point: about 110° C., molecular weight: 741, 3,9-bis[2-{3-(3-tert-butyl-4-hydroxy-5-methylphenyl)propionyloxy}-1,1-dimethylethyl]-2,4,8,10-tetraoxaspiro[5,5]undecane It is also preferable that a compound having a hindered amine group is used as an antioxidant (C). A compound having a hindered amine group prevents thermal degradation of an EVOH (A), and is further capable of capturing an aldehyde generated by thermal decomposition of the EVOH (A). It allows for reducing generation of decomposed gas, so that void formation and bubble generation during molding can be reduced.

A compound having a hindered amine group is preferably a piperidine derivative and among others, is more preferably a 2,2,6,6-tetraalkylpiperidine derivative having a substituent at 4-position. Examples of the 4-position substituent include a carboxyl group, an alkoxy group and an alkylamino group. Furthermore, N-position of a hindered amine group in a compound having a hindered amine group can be substituted with an alkyl group.

A compound having a hindered amine group can be selected from commercially available compounds, including the following products.

(9) BASF, "TINUVIN 770": melting point: 81 to 85° C., molecular weight: 481, bis(2,2,6,6-tetramethyl-4-piperidyl) sebacate

(10) BASF, "TINUVIN 765": liquid compound, molecular weight: 509, bis(1,2,2,6,6-pentamethyl-4-piperidyl) sebacate and 1,2,2,6,6-pentamethyl-4-piperidyl sebacate (mixture)

(11) BASF, "TINUVIN 622LD": melting point: 55 to 70° C., molecular weight: 3100-4000, dimethyl succinate.1-(2-hydroxyethyl)-4-hydroxy-2,2,6,6-tetramethylpiperidine polycondensate

(12) BASF, "CHIMASSORB 119FL": melting point 130 to 140° C., molecular weight: 2000 or more, N,N'-bis(3-aminopropyl)ethylenediamine.2,4-bis[N-butyl-N-(1,2,2,6,6-pentamethyl-4-piperidyl)amino]-6-chloro-1,3,5-triazine condensate

(13) BASF, "CHIMASSORB 944LD": melting point: 100 to 135° C., molecular weight: 2000-3100, poly[[6-(1,1,3,3-tetramethylbutyl)amino-1,3,5-triazine-2,4-diyl](2,2,6,6-tetramethyl-4-piperidyl)imino]hexamethylene(2,2,6,6-tetramethyl-4-piperidyl)imino]]

(14) BASF, "TINUVIN 144": melting point: 146 to 150° C., molecular weight: 685, bis(1,2,2,6,6-pentamethyl-4-piperidyl)[[3,5-bis(1,1-dimethylethyl)-4-hydroxyphenyl]methyl]butyl malonate

(15) BASF, "UVINUL 4050H": melting point: 157° C., molecular weight: 450, N,N'-1,6-hexanediyl bis{N-(2,2,6,6-tetramethyl-4-piperidinyl)-formamide}

(16) BASF, "UVINUL 5050H": melting point: 104 to 112° C., molecular weight: about 3500, a compound having the structural formula below.

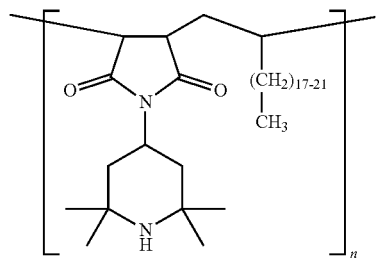

These compounds having a hindered phenol group or a hindered amine group can be used alone or in combination of two or more.

A content of an antioxidant (C) in a resin composition is preferably 0.01 to 5 parts by mass based on 100 parts by mass of an EVOH (A). If a content of an antioxidant (C) is less than 0.01 parts by mass, the effects described above may be not achieved. A content of an antioxidant (C) is more preferably 0.05 parts by mass or more, further preferably 0.1 parts by mass or more. If a content of an antioxidant (C) is more than 5 parts by mass, the antioxidant (C) may be poorly dispersed. A content of an antioxidant (C) is preferably 4 parts by mass or less, further preferably 3 parts by mass or less based on 100 parts by mass of an EVOH (A).

As long as the effects of the present invention are not impaired, a resin composition can contain another additive other than an EVOH (A), an elastomer (B) and an antioxidant (C). Examples of such another additive include resins other than an EVOH (A) and an elastomer (B), metal salts, acids, boron compounds, plasticizers, fillers, antiblocking agents, lubricants, stabilizers, surfactants, colorants, ultraviolet absorbers, antistatic agents, desiccants, cross-linkers, filling materials and reinforcing agents such as various fibers, and among others, preferred are metal salts and acids in the light of thermal stability and adhesiveness to another resin of the resin composition.

A metal salt is preferably an alkali metal salt in the light of further improving interlayer adhesion, and preferably an alkaline-earth metal salt in the light of thermal stability. If a resin composition contains a metal salt, its content is preferably 1 to 10000 ppm in terms of a metal element. A content of a metal salt is more preferably 5 ppm or more, further preferably 10 ppm or more, particularly preferably 20 ppm or more in terms of a metal element. Meanwhile, a content of a metal salt is more preferably 5000 ppm or less, further preferably 1000 ppm or less, particularly preferably 500 ppm or less in terms of a metal element. A content of a metal salt can be determined by, for example, quantification for a sample obtained by freeze grinding of dried EVOH pellets, using an ICP emission analyzing device.

An acid is preferably a carboxylic acid compound or a phosphoric acid compound in the light of improving thermal stability during melt molding. When a resin composition contains a carboxylic acid compound, its content is preferably 1 to 10000 ppm. A content of a carboxylic acid compound is more preferably 10 ppm or more, further preferably 50 ppm or more. Meanwhile, a content of a carboxylic acid compound is more preferably 1000 ppm or less, further preferably 500 ppm or less. A content of an acid can be determined by, for example, neutralization titration.

When a resin composition contains a phosphoric acid compound, its content is preferably 1 to 10000 ppm. A content of a phosphoric acid compound is more preferably 10 ppm or more, further preferably 30 ppm or more.

Meanwhile, a content of a phosphoric acid compound is more preferably 1000 ppm or less, further preferably 300 ppm or less. A content of a phosphoric acid compound can be determined by, for example, quantification for a sample obtained by freeze grinding of dried EVOH pellets, using an ICP emission analyzing device.

When a resin composition contains a boron compound, its content is preferably 1 to 2000 ppm. A content of a boron compound is more preferably 10 ppm or more, further preferably 50 ppm or more. Meanwhile, a content of a boron compound is more preferably 1000 ppm or less, further preferably 500 ppm or less. With a content of a boron compound in a resin composition being within the above range, thermal stability during melt molding is further improved. A content of a boron compound can be determined as described for a phosphoric acid compound.

A phosphoric acid compound, a carboxylic acid or a boron compound as described above can be contained in a resin composition suitably by, for example, adding the compound to an EVOH composition, which is then kneaded, in producing pellets or the like of the resin composition. These compounds can be added to an EVOH composition, for example, by adding a dry powder; adding a paste impregnated with a solvent; adding a suspension prepared by suspending it in a liquid; adding a solution prepared by dissolving it in a solvent; and immersing EVOH pellets in a solution. Among these, adding a solution prepared by dissolving it in a solvent or immersing EVOH pellets in a solution are preferable in the light of homogeneously dispersing a phosphoric acid compound, a carboxylic acid or a boron compound. A solvent is suitably, for example, water in the light of solubility of additives, a cost, handleability, safety of working environment, and the like.

A resin composition can be prepared by blending an EVOH (A), an elastomer (B) and, if necessary, an antioxidant (C) and other additives described above. These can be blended by a known method for blending resins. When melt kneading is used, an EVOH (A), an elastomer (B), and if necessary an antioxidant (C), a stabilizer, a dye, a pigment, a plasticizer, a lubricant, a filler, another resin and the like are combined, and then the mixture can be melt-kneaded, for example, at 200 to 300° C. using a screw extruder and so on.

Multilayer structured polymer particles used for preparing a resin composition can be pellets in which outermost layers of multilayer structured polymer particles are mutually fused, as long as they can be sufficiently dispersed as particles when being mixed with an EVOH (A).

Examples of a polyethylene used for a polyethylene layer in an inner tube of a fuel pipe of the present invention include polyethylenes such as a low-density polyethylene, a linear low-density polyethylene, a medium-density polyethylene and a high-density polyethylene; and ethylenic copolymers produced by copolymerizing ethylene with an α-olefin such as 1-butene, 1-hexene and 4-methyl-1-pentene. Polyethylenes can be used alone or in combination of two or more. Among these, a polyethylene used for a polyethylene layer in an inner tube is preferably a high-density polyethylene.

An MFR (melt flow rate, 190° C., under the load of 2160 g) of a polyethylene used for a polyethylene layer in an inner tube is preferably 0.01 to 10 g/10 min. If an MFR of a polyethylene is less than 0.01 g/10 min, melt molding may be difficult. Meanwhile, if an MFR of a polyethylene is more than 10 g/10 min, a polyethylene layer may be deteriorated in strength or difficult to be extrusion-molded. An MFR of a polyethylene is more preferably 5 g/10 min or less, further preferably 3 g/10 min or less, particularly preferably 2 g/10 min or less.

In an inner tube, a resin composition layer can directly adhere to another layer such as a polyethylene layer, or preferably adhere via an adhesive resin layer.

Preferable examples of a resin used for an adhesive resin layer include a polyurethane or polyester one-liquid or two-liquid curable adhesive; and a polyolefin having a carboxyl group, a carboxylic anhydride group or an epoxy group. Among these, a polyolefin having a carboxyl group, a carboxylic anhydride group or an epoxy group is more preferable in the light of having excellent adhesiveness to both EVOH (A) and polyethylene.

Examples of a polyolefin having a carboxyl group include a polyolefin produced by copolymerizing acrylic or methacrylic acid, where all or some of carboxyl groups in the polyolefin can be present in the form of a metal salt, as represented by an ionomer. Examples of a polyolefin having a carboxylic anhydride group include a polyolefin produced by a polyolefin graft-modified with maleic anhydride or itaconic acid. Examples of a polyolefin resin having an epoxy group include a polyolefin produced by copolymerizing glycidyl methacrylate. Among these polyolefins having a carboxyl group, a carboxylic anhydride group or an epoxy group, a polyolefin modified with a carboxylic anhydride such as maleic anhydride, particularly a polyethylene is preferable in the light of excellent adhesiveness.

A content of a polyethylene in a polyethylene layer of an inner tube is generally 50% by mass or more, more preferably 70% by mass or more, further preferably 80% by mass or more, particularly preferably 90% by mass or more.

As long as the effects of the present invention are not impaired, a polyethylene layer of an inner tube can contain an additive other than a polyethylene. The additive can be selected from those described as an additive other than an EVOH (A) and an elastomer (B) contained in a resin composition.

Recovered and recycled inner tube and outer tubes described later can be used as a material for a polyethylene layer of an inner tube.

An inner tube used for a fuel pipe of the present invention is a multilayer pipe comprising a resin composition layer and a polyethylene layer having a layer structure as exemplified below. In these examples, the left side is inner while the right side is outer.

Two layers: (inner) resin composition layer/polyethylene layer (outer), polyethylene layer/resin composition layer Three layers: resin composition layer/adhesive resin layer/polyethylene layer, polyethylene layer/adhesive resin layer/resin composition layer, polyethylene layer/resin composition layer/polyethylene layer Four layers: polyethylene layer/resin composition layer/adhesive resin layer/polyethylene layer Five layers: polyethylene layer/adhesive resin layer/resin composition layer/adhesive resin layer/polyethylene layer A thickness of an inner tube must be 5 mm or more. If a thickness of an inner tube is less than 5 mm, flattening strength of a fuel pipe of the present invention is deteriorated. Meanwhile, a thickness of an inner tube is generally 50 mm or less, preferably 20 mm or less. Here, flattening strength is compressive strength of a fuel pipe to compression from a direction vertical to a longitudinal direction (fuel flow direction) of the fuel pipe.

A ratio of a thickness of a resin composition layer to a thickness of an inner tube (resin composition layer/inner tube) must be 0.02 to 0.2. If the thickness ratio (resin composition layer/inner tube) is less than 0.02, fuel barrier properties are insufficient. Meanwhile, the thickness ratio (resin composition layer/inner tube) is preferably 0.1 or less in the light of prevention of deterioration of fuel barrier properties after deformation and a cost.

A resin composition layer is disposed at an inner position of the whole thickness in an inner tube, giving a pipe having more excellent fuel barrier properties in comparison with the case where it is disposed at the center of the whole thickness. The more distant it is from the center, the larger the effect is.

An inner tube can be produced by, for example, melt molding or solution coating. When melt molding is employed, co-extrusion molding, co-injection molding, extrusion coating is selected. Multilayer molding such dry lamination can be employed.

When melt molding is employed, it is recommended that for example, the process comprises cooling an inner tube immediately after molding with water at 10 to 70° C. In other words, it is preferable that after melt molding, a resin composition layer is cooled with water at 10 to 70° C. to solidify the resin composition layer. If a temperature of cooling water is too low, cracks may be apt to occur when a fuel pipe is deformed. Although the cause of cracks is not clearly understood, it is inferred that residual stress in a molded article influences crack formation. In this light, a temperature of cooling water is more preferably 15° C. or higher, further preferably 20° C. or higher. Meanwhile, if a temperature of cooling water is too high, cracks may be apt to occur when a fuel pipe is deformed. Although the cause of cracks is not clearly understood, it is inferred that an excessively higher crystallinity degree of the resin composition causes cracks. In this light, a temperature of cooling water is more preferably 60° C. or lower, further preferably 50° C. or lower.

A multilayer pipe obtained by the above method can be subjected to secondary processing. Secondary processing can be appropriately a known secondary processing; for example, a processing method wherein a multilayer pipe is heated to 80 to 160° C. and then formed into a desired shape, and fixing the state for 1 min to 2 hours.

In a fuel pipe of the present invention, an outer tube has a layer made of a polyethylene. The polyethylene layer of the outer tube can be as described for a polyethylene layer of the above inner tube. The outer tube can have another layer other than a polyethylene layer; for example, a resin composition layer used for the above inner tube, and a layer like an adhesive resin layer. From the view point of cost, the outer tube is preferably a monolayer pipe made of a polyethylene layer alone.

There are no particular restrictions to a thickness of an outer tube as long as the effects of the present invention are not impaired, and in the light of further improving flattening strength, it is preferably 1 mm or more, more preferably 2 mm or more. Meanwhile, a thickness of an outer tube is generally 50 mm or less, preferably 20 mm or less. There are also no particular restrictions to an outer diameter of an outer tube as long as the effects of the present invention are not impaired, and it is generally 20 to 400 mm.

An outer tube is produced by a known method such as melt molding. Melt molding can be extrusion molding, injection molding or the like.

An inner tube can be inserted into an outer tube thus obtained, to give a fuel pipe comprising double tubes. A fuel pipe of the present invention having such a double tube structure has higher flattening strength. Furthermore, even when cracks are formed in one tube due to deformation, the other tube can prevent fuel from leaking out. As long as such effects are not impaired, there are no particular restrictions to a difference between an inner diameter of an outer tube and an outer diameter of an inner tube (an inner diameter of an outer tube—an outer diameter of an inner tube), and it is generally 0.5 to 10 mm. Furthermore, in a fuel pipe of the present invention, a part of the inner surface of an outer tube can adhere to a part of the outer surface of an inner tube. An inner surface of an outer tube can be adhered to an outer surface of an inner tube by, for example, winding an electric heating wire as a joint wire around the outer surface of the inner tube in a coil shape, inserting the inner tube into the outer tube, and then applying voltage to the wire to fuse the inner surface of the outer tube and the outer surface of the inner tube.

In a fuel pipe of the present invention, a ratio of a thickness of an outer tube to a thickness of an inner tube (outer tube/inner tube) must be 0.1 to 5, and when the ratio is within this range, a fuel pipe having higher flattening strength can be obtained. The ratio (outer tube/inner tube) is preferably 0.2 or more. Meanwhile, the ratio (outer tube/inner tube) is preferably 3 or less, more preferably 2 or less, further preferably 1.5 or less.

A fuel pipe of the present invention has higher flattening strength and can prevent deterioration of fuel barrier properties even when it is deformed in a direction vertical to a longitudinal direction (fuel flow direction). A fuel pipe of the present invention produced without using steel is light-weighted, resulting in a higher construction efficiency during installation. A method for transporting fuel, comprising transporting fuel using such a fuel pipe is a suitable embodiment of the present invention. A fuel pipe of the present invention is preferably a fuel pipe for underground burial. A fuel pipe of the present invention is resistant to deformation when it is buried in the ground and a force is applied to it from the ground, and even when it is deformed, fuel leakage hardly occurs. A method for transporting fuel, comprising burying a fuel pipe of the present invention in the ground, and then transporting fuel using the fuel pipe is a more suitable embodiment of the present invention.

EXAMPLES

There will be further specifically described the present invention with reference to Examples.

(1) An Average Primary Particle Size of Multilayer Structured Polymer Particles

Using an ultramicrotome (model: Ultracut S/FC-S) manufactured by Leica, resin composition pellets obtained in Examples and Comparative Examples were cut into an ultrathin section for observation by a transmission electron microscope. Cutting conditions are as follows.

Sample: −100° C.
Knife: −100° C.
Cutting speed: 0.4 to 1.0 mm/s
Set value of cutting thickness: 85 nm
Thickness: 85 nm An ultrathin section obtained was collected with a copper mesh (1000 mesh), and electronically stained using a solution of phosphomolybdic acid.

An ultrathin section obtained was observed for its structure under the following conditions. Structure observation was conducted using a transmission electron microscope from Hitachi High-Tech Corporation (model: HT7700, 3DTEM equivalent) equipped with a LaB6 electron gun.

Acceleration voltage: 100 kV
LaB6 electron beam dose: 10 μA
Spot size of electron beam: 1 μm Condenser aperture diameter: 0.1 mm (No. 2)

3D objective movable aperture diameter: 0.16 mm (No. 3)

A CCD camera for imaging and recording was a bottom mount camera (model: XR81B, 8-megapixel camera) manufactured by AMT, and for an observed image of an ultrathin section obtained, an average of a major diameter and a minor diameter of a particle was calculated. For twenty particles, such an average was calculated and an average of all of these was recorded as an average primary particle size of multilayer structured polymer particles.

(2) An Average Secondary Particle Size of Multilayer Structured Polymer Particles For an aggregate of multilayer structured polymer particles, an average of a major diameter and a minor diameter was calculated as described for an average primary particle size. For twenty aggregates, such an average was calculated and an average of these was recorded as an average secondary particle size of multilayer structured polymer particles.

(3) Fuel Barrier Properties

One end of a double tube cut to the length of 100 mm was sealed using an aluminum tape ("Aluminum Seal" manufactured by FP Kako Co., Ltd. (gasoline permeation amount: 0 g/m$^2$·day)). The double tube was filled with 500 mL of CE10 (toluene: 45% by volume, isooctane: 45% by volume, ethanol: 10% by volume) as a model gasoline, and then the other end was sealed with an aluminum tape. The double tube filled with the model gasoline was placed in an explosion proof type thermohygrostat bath (40° C., 65% RH), and a mass of the double tube was measured once every seven days for three months. A fuel permeation amount was calculated from a mass change of the double tube, and fuel barrier properties of the double tube were evaluated in accordance with the following criteria.

A: less than 0.01 g/day

B: 0.01 g/day or more and less than 0.1 g/day

C: 0.1 g/day or more (4) Flattening Strength Measurement

A double tube was cut to a length of 100 mm. Using a compressor (AYS model tabletop test press manufactured by Shinto Metal Industries, Ltd.), the double tube was compressed at a speed of 30 mm/min from a direction vertical to a longitudinal direction (fuel flow direction). A compressive strength when a dimensional change rate of the double tube reached 10% was recorded as a flat compression strength of the double tube, which as evaluated in accordance with the following criteria.

A: 1 kN/100 mm or more

B: 0.5 kN/100 mm or more and less than 1 kN/100 mm

C: less than 0.5 kN/100 mm

Here, a dimensional change rate was determined in accordance with the following equation, using an outer diameter D of the double tube before deformation (before compression), and a minor diameter d (in a direction vertical to a longitudinal direction) of the double tube after deformation.

Dimensional change rate (%)=(1−d/D)×100

(5) Fuel Barrier Properties of a Double Tube after Deformation

As described above in "(4) Flattening strength measurement", a double tube was compressed such that a dimensional change rate became 10%, keeping the state for 24 hours. After releasing pressure, the double tube was removed and its gasoline permeation amount was measured as described above in "(3) Fuel barrier properties". A ratio of a gasoline permeation amount before and after deformation (a gasoline permeation amount after deformation/a gasoline permeation amount before deformation) was calculated and change of fuel barrier properties of the double tube was evaluated in accordance with the following criteria.

A: less than 1.3

B: 1.3 or more and less than 3

C: 3 or more

[Production of an EVOH-1]

Two kg of an EVOH resin with an ethylene unit content of 32 mol % and a saponification degree of 99.8 mol % was added to 18 kg of a mixed solvent of water/methanol=40/60 (mass ratio), and the mixture was stirred at 60° C. for 6 hours for complete dissolution. This solution was continuously extruded from a nozzle with a diameter of 4 mm into a coagulating bath of water/methanol=90/10 (mass ratio) adjusted to 0° C., to coagulate an EVOH as a strand. This strand was introduced to a pelletizer to provide porous EVOH chips.

The porous EVOH chips thus obtained were washed with an aqueous solution of acetic acid and ion-exchanged water, and then immersed in an aqueous solution containing acetic acid, potassium dihydrogen phosphate, sodium acetate and orthoboric acid. The EVOH chips were separated from the aqueous solution for treatment, drained and placed in a hot air dryer, and dried at 80° C. for 4 hours and further at 100° C. for 16 hours, to give dried EVOH pellets (EVOH-1). For the EVOH-1, an acetic acid content was 150 ppm, a sodium ion content was 140 ppm, a phosphate compound content was 45 ppm in terms of phosphoric acid, and a boron compound content was 260 ppm in terms of boron. An MFR (ASTM-D1238, 190° C., load: 2160 g) of EVOH-1 was 1.6 g/10 min.

[Production of Multilayer Structured Polymer Particles P-1]

To a polymerization vessel equipped with a stirring blade, a reflux condenser and a dropping funnel were added under nitrogen atmosphere 600 parts by mass of distilled water, and as an emulsifier, 0.168 parts by mass of sodium lauryl sarcosinate and 2.1 parts by mass of sodium stearate, and the mixture was heated to 70° C. to give a homogeneous solution. Then, at the same temperature, 150 parts by mass of butyl acrylate (BA) and as a multifunctional polymerizable monomer, 0.15 parts by mass of allyl methacrylate were added and the mixture was stirred for 30 min, and then 0.15 parts by mass of potassium peroxodisulfate was added to initiate polymerization. After 4 hours, complete consumption of all of the monomers was confirmed by gas chromatography.

Subsequently, to the copolymer latex obtained was added 0.3 parts by mass of potassium peroxodisulfate, and was then added dropwise a mixture of 50 parts by mass of methyl methacrylate and 10 parts by mass of glycidyl methacrylate (GMA) via a dropping funnel over 2 hours. At the end of addition, the reaction was continued at 70° C. for further 30 min, and after confirming monomer consumption, polymerization was completed. A particle size of the copolymer latex obtained was 0.4 μm. This was cooled to −20° C. for 24 hours for coagulation, and then a coagulate was collected and washed three times with hot water at 80° C. Furthermore, it was dried at 50° under reduced pressure for 2 days, to afford multilayer structured polymer particles P-1. The multilayer structured polymer particles P-1 thus obtained were two-layer structure (core-shell structure) polymer particles (average primary particle size: 0.4 μm) having an innermost layer (core, 70% by mass) made of a polymer component (Tg=−39° C.) containing butyl acrylate (BA) as a main component and an outermost layer (shell, 30% by mass) made of a polymethyl methacrylate (PMMA, Tg=106° C.) modified with glycidyl methacrylate (GMA, content: 25 mol %).

[Production of Multilayer Structured Polymer Particles P-2, P-4, and P-5]

Multilayer structured polymer particles (P-2: 0.8 µm, P-4: 0.2 µm, P-5: 4 µm) were produced as described for multilayer structured polymer particles P-1 except that an average primary particle size of polymer particles was changed by adjusting a polymerization reaction time of butyl acrylate.

[Production of Multilayer Structured Polymer Particles P-3]

Multilayer structured polymer particles P-3 were produced as described for multilayer structured polymer particles P-1, substituting 50 parts by mass of styrene (St) for methyl methacrylate. The multilayer structured polymer particles P-3 thus obtained were two-layer structure (core-shell structure) polymer particles (average primary particle size: 0.4 µm) having an innermost layer (core, 70% by mass) made of a polymer component (Tg=−39° C.) containing butyl acrylate (BA) as a main component and an outermost layer (shell, 30% by mass) made of a polystyrene (Tg=98° C.) modified with glycidyl methacrylate (content: 25 mol %).

Example 1

Ninety parts by mass of EVOH-1 as an EVOH (A), 10 parts by mass of multilayer structured polymer particles P-1 as an elastomer (B), and 0.5 parts by mass of N,N'-hexane-1,6-diyl bis[3-(3,5-di-tert-butyl-4-hydroxyphenyl)propionamide] as an antioxidant (C) were dry-blended at a screw rotation speed of 50 rpm, and the mixture obtained was pelletized at an extrusion temperature of 200° C. using a 30 mmφ co-rotation twin screw extruder (The Japan Steel Works, Ltd., "TEX-30N"), to afford resin composition pellets.

The resin composition pellets, a polyethylene modified with maleic anhydride, and high-density polyethylene [density: 0.96 g/cc, MFR (measured at 190° C. under a load of 2160 g) 0.5 g/10 min] pellets were charged into a first extruder, a second extruder and a third extruder, respectively. Using a three-material, three-layer circular die, they are extrusion molded to give a multilayer pipe for an inner tube with an outer diameter of 100 mm and a thickness of 6 mm, and immediately, it was allowed to pass through a cooling water tank regulated to 40° C., to be solidified. The multilayer pipe had a layer structure of high-density polyethylene layer (outermost layer)/maleic-anhydride modified polyethylene (adhesive resin layer)/resin composition layer (innermost layer)=5640 µm/180 µm/180 µm.

Separately, the above high-density polyethylene pellets were charged in an extruder, and using a one-layer circular die, extrusion molding was conducted to form a monolayer pipe for an outer tube with an inner diameter of 105 mm and a thickness of 6 mm, and immediately, it was allowed to pass through a cooling water tank regulated to 40° C., to be solidified. Here, in a subsequent process for producing a double tube, an inner diameter of the outer tube was made larger than an outer diameter of the inner tube in such an extent that the inner tube wound with a joint wire around the outer surface was allowed to be inserted in the outer tube.

Around the outer surface of the multilayer pipe for an inner tube obtained was wound an electric heating wire surface-coated with a high-density polyethylene as a joint wire in a coil shape, and then the multilayer pipe was inserted in the monolayer pipe for the outer tube. Voltage was applied to the joint wire to fuse a part of the outer surface of the inner tube and a part of the inner surface of the outer tube, giving a double tube. The double tube thus obtained was evaluated. The results are shown in Table 1.

Example 2

A fuel tube was produced and evaluated as described in Example 1, except that a layer structure of a multilayer pipe for an inner tube was changed to high-density polyethylene layer (outermost layer)/maleic-anhydride modified polyethylene (adhesive resin layer)/resin composition layer (innermost layer)=6580 µm/210 µm/210 µm and that a thickness of a monolayer pipe for an outer tube was changed to 7 mm. The results are shown in Table 1.

Example 3

A fuel pipe was produced and evaluated as described in Example 1, except that a layer structure of a multilayer pipe for an inner tube was changed to high-density polyethylene layer (outermost layer)/maleic-anhydride modified polyethylene (adhesive resin layer)/resin composition layer (innermost layer)=5400 µm/300 µm/300 µm. The results are shown in Table 1.

Example 4

A fuel pipe was produced and evaluated as described in Example 1, except that a layer structure of a multilayer pipe for an inner tube was changed to high-density polyethylene layer (outermost layer)/maleic-anhydride modified polyethylene (adhesive resin layer)/resin composition layer (innermost layer)=7520 µm/240 µm/240 µm, and that a thickness of a monolayer pipe for an outer tube was changed to 4 mm. The results are shown in Table 1.

Example 5

A fuel pipe was produced and evaluated as described in Example 1, except that a layer structure of a multilayer pipe for an inner tube was changed to high-density polyethylene layer (outermost layer)/maleic-anhydride modified polyethylene (adhesive resin layer)/resin composition layer (innermost layer)=4700 µm/150 µm/150 µm, and that a thickness of a monolayer pipe for an outer tube was changed to 7 mm. The results are shown in Table 1.

Example 6

A fuel pipe was produced and evaluated as described in Example 1, except that an elastomer (B) was the multilayer structured polymer particles P-2 and that dry blending was conducted at a screw rotation speed of 100 rpm. The results are shown in Table 1.

Example 7

A fuel pipe was produced and evaluated as described in Example 1, except that dry blending was conducted at a screw rotation speed of 150 rpm. The results are shown in Table 1.

Example 8

A fuel pipe was produced and evaluated as described in Example 1, except that dry blending was conducted at a screw rotation speed of 25 rpm.
The results are shown in Table 1.

Example 9

A fuel pipe was produced and evaluated as described in Example 1, except that multilayer structured polymer particles P-3 were used as an elastomer (B). The results are shown in Table 1.

Example 10

A fuel pipe was produced and evaluated as described in Example 1, except that contents of an EVOH (A) and of multilayer structured polymer particles were changed to 70 parts by mass and 30 parts by mass, respectively. The results are shown in Table 1.

Examples 11 and 12

A fuel pipe was produced and evaluated as described in Example 1, except that a content of ethylene in an EVOH used as an EVOH (A) was changed as shown in Table 1 (Example 11: EVOH-2, Example 12: EVOH-3). The results are shown in Table 1.

Examples 13 and 14

A fuel pipe was produced and evaluated as described in Example 1, except that multilayer structured polymer particles P-4 (Example 13) or multilayer structured polymer particles P-5 (Example 14) were used as an elastomer (B). The results are shown in Table 1.

Example 15

A fuel pipe was produced and evaluated as described in Example 1, except that a layer structure of a multilayer pipe for an inner tube was changed to resin composition layer (outermost layer)/maleic-anhydride modified polyethylene (adhesive resin layer)/high-density polyethylene layer (innermost layer)=180 μm/180 μm/5640 μm. The results are shown in Table 2.

Examples 16 to 18

A fuel pipe was produced and evaluated as described in Example 1, substituting a maleic-anhydride modified ethylene-butene copolymer (EB, "Tafmer MH7020" manufactured by Mitsui Chemicals Inc.: Example 16), a polyurethane (TPU, "ET890" manufactured by BASF: Example 17) or maleic-anhydride modified styrene-ethylene/butylene-styrene block copolymer (SEBS, "Tuftec M1943" manufactured by Asahi Kasei Corporation: Example 18) for multilayer structured polymer particles P-1. The results are shown in Table 2.

Comparative Example 1

A fuel pipe was produced and evaluated as described in Example 1, except that a layer structure of a multilayer pipe for an inner tube was changed to high-density polyethylene layer (outermost layer)/maleic-anhydride modified polyethylene (adhesive resin layer)/resin composition layer (innermost layer)=2820 μm/90 μm/90 μm, and that a thickness of a monolayer pipe for an outer tube was changed to 3 mm. The results are shown in Table 2.

Comparative Example 2

A fuel pipe was produced and evaluated as described in Example 1, except that a thickness of a monolayer pipe for an outer tube was changed to 0.48 mm. The results are shown in Table 2.

Comparative Example 3

A fuel pipe was produced and evaluated as described in Example 1, except that a layer structure of a multilayer pipe for an inner tube was changed to high-density polyethylene layer (outermost layer)/maleic-anhydride modified polyethylene (adhesive resin layer)/resin composition layer (innermost layer)=940 μm/30 μm/30 μm. The results are shown in Table 2.

Comparative Example 4

A fuel pipe was produced and evaluated as described in Example 1, except that a layer structure of a multilayer pipe for an inner tube was changed to high-density polyethylene layer (outermost layer)/maleic-anhydride modified polyethylene (adhesive resin layer)/resin composition layer (innermost layer)=5880 μm/60 μm/60 μm. The results are shown in Table 2.

Comparative Example 5

A multilayer pipe for an inner tube was produced as described in Example 1, and without being covered with an outer tube, was evaluated. The results are shown in Table 2.

Comparative Example 6

A multilayer pipe for an inner tube was produced as described in Example 1 except that its thickness was 12 mm, and without being covered with an outer tube, was evaluated. The results are shown in Table 2.

Comparative Example 7

A fuel pipe was produced and evaluated as described in Example 1, except that multilayer structured polymer particles were not added. The results are shown in Table 2.

Comparative Examples 8 and 9

A fuel pipe was produced and evaluated as described in Example 1, except that multilayer structured polymer particles were not added and that a content of ethylene in an EVOH as an EVOH (A) was changed as shown in Table 2. The results are shown in Table 2.

Comparative Example 10

A fuel pipe was produced and evaluated as described in Example 1, except that multilayer structured polymer particles were not added and that Nylon-6 (PA6, BASF, "ULTRAMID A3K") was used in place of an EVOH (A). The results are shown in Table 2.

TABLE 1

| | | | Example 1 | Example 2 | Example 3 | Example 4 | Example 5 | Example 6 | Example 7 |
|---|---|---|---|---|---|---|---|---|---|
| Resin composition | Elastomer (B) | Type | P-1 | P-1 | P-1 | P-1 | P-1 | P-2 | P-1 |
| | | Composition (Innermost layer/Outermost layer) | BA/MMA | BA/MMA | BA/MMA | BA/MMA | BA/MMA | BA/MMA | BA/MMA |
| | | Glass transition temperature (° C.) | −39/106 | −39/106 | −39/106 | −39/106 | −39/106 | −39/106 | −39/106 |
| | | Primary particle size (μm) | 0.4 | 0.4 | 0.4 | 0.4 | 0.4 | 0.8 | 0.4 |
| | | Secondary particle size (μm) | 3 | 3 | 3 | 3 | 3 | 3 | 1.1 |
| | | Content (% by mass) | 10 | 10 | 10 | 10 | 10 | 10 | 10 |
| | EVOH (A) | Type | EVOH-1 | EVOH-1 | EVOH-1 | EVOH-1 | EVOH-1 | EVOH-1 | EVOH-1 |
| | | Ethylene content (mol %) | 32 | 32 | 32 | 32 | 32 | 32 | 32 |
| | | Content (% by mass) | 90 | 90 | 90 | 90 | 90 | 90 | 90 |
| Pipe | Outer tube | Thickness (mm) | 6 | 7 | 6 | 4 | 7 | 6 | 6 |
| | Inner tube | Thickness (mm) | 6 | 7 | 6 | 8 | 5 | 6 | 6 |
| | | Thickness ratio (Resin composition layer/Inner tube) | 0.03 | 0.03 | 0.05 | 0.03 | 0.03 | 0.03 | 0.03 |
| | Whole | Thickness ratio (Outer tube/Inner tube) | 1 | 1 | 1 | 0.5 | 1.4 | 1 | 1 |
| Property evaluation | | Barrier properties | A | A | A | A | A | A | A |
| | | Flattening strength | A | A | A | A | B | A | A |
| | | Barrier properties after deformation | A | A | A | A | A | B | B |

| | | | Example 8 | Example 9 | Example 10 | Example 11 | Example 12 | Example 13 | Example 14 |
|---|---|---|---|---|---|---|---|---|---|
| Resin composition | Elastomer (B) | Type | P-1 | P-3 | P-1 | P-1 | P-1 | P-4 | P-5 |
| | | Composition (Innermost layer/Outermost layer) | BA/MMA | BA/MMA | BA/MMA | BA/MMA | BA/MMA | BA/MMA | BA/MMA |
| | | Glass transition temperature (° C.) | −39/106 | −39/106 | −39/106 | −39/106 | −39/106 | −39/106 | −39/106 |
| | | Primary particle size (μm) | 0.4 | 0.4 | 0.4 | 0.4 | 0.4 | 0.2 | 4 |
| | | Secondary particle size (μm) | 8 | 3 | 3 | 3 | 3 | 5 | 4 |
| | | Content (% by mass) | 10 | 10 | 10 | 10 | 10 | 10 | 10 |
| | EVOH (A) | Type | EVOH-1 | EVOH-1 | EVOH-1 | EVOH-2 | EVOH-3 | EVOH-1 | EVOH-1 |
| | | Ethylene content (mol %) | 32 | 32 | 32 | 27 | 44 | 32 | 32 |
| | | Content (% by mass) | 90 | 90 | 70 | 90 | 90 | 90 | 90 |
| Pipe | Outer tube | Thickness (mm) | 6 | 6 | 6 | 6 | 6 | 6 | 6 |
| | Inner tube | Thickness (mm) | 6 | 6 | 6 | 6 | 6 | 6 | 6 |
| | | Thickness ratio (Resin composition layer/Inner tube) | 0.03 | 0.03 | 0.03 | 0.03 | 0.03 | 0.03 | 0.03 |
| | Whole | Thickness ratio (Outer tube/Inner tube) | 1 | 1 | 1 | 1 | 1 | 1 | 1 |
| Property evaluation | | Barrier properties | B | A | B | A | B | A | A |
| | | Flattening strength | A | A | A | A | A | A | A |
| | | Barrier properties after deformation | A | B | A | B | A | B | B |

TABLE 2

| | | | Example 15 | Example 16 | Example 17 | Example 18 | Comparative Example 1 | Comparative Example 2 | Comparative Example 3 |
|---|---|---|---|---|---|---|---|---|---|
| Resin composition | Elastomer (B) | Type | P-1 | EB*[1] | TPU*[2] | SEBS*[3] | P-1 | P-1 | P-1 |
| | | Composition (Innermost layer/Outermost layer) | BA/MMA | | | | BA/MMA | BA/MMA | BA/MMA |
| | | Glass transition temperature (° C.) | −39/106 | −50 | −40 | −50 | −39/106 | −39/106 | −39/106 |
| | | Primary particle size (μm) | 0.4 | — | — | — | 0.4 | 0.4 | 0.4 |
| | | Secondary particle size (μm) | 3 | — | — | — | 3 | 3 | 3 |
| | | Content (% by mass) | 10 | 10 | 10 | 10 | 10 | 10 | 10 |
| | EVOH (A) | Type | EVOH-1 | EVOH-1 | EVOH-1 | EVOH-1 | EVOH-1 | EVOH-1 | EVOH-1 |
| | | Ethylene content (mol %) | 32 | 32 | 32 | 32 | 32 | 32 | 32 |
| | | Content (% by mass) | 90 | 90 | 90 | 90 | 90 | 90 | 90 |

TABLE 2-continued

| Pipe | Outer tube | Thickness (mm) | 6 | 6 | 6 | 6 | 3 | 0.48 | 6 |
|---|---|---|---|---|---|---|---|---|---|
| | Inner tube | Thickness (mm) | 6 | 6 | 6 | 6 | 3 | 6 | 1 |
| | | Thickness ratio (Resin composition layer/Inner tube) | 0.03 | 0.03 | 0.03 | 0.03 | 0.03 | 0.03 | 0.03 |
| | Whole | Thickness ratio (Outer tube/Inner tube) | 1 | 1 | 1 | 1 | 1 | 0.08 | 6 |
| Property evaluation | | Barrier properties | A | B | B | B | A | A | C |
| | | Flattening strength | A | B | B | B | C | C | C |
| | | Barrier properties after deformation | B | B | B | B | A | A | A |

| | | | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|
| Resin composition | Elastomer (B) | Type | P-1 | P-1 | P-1 | Not added | Not added | Not added | Not added |
| | | Composition (Innermost layer/Outermost layer) | BA/MMA | BA/MMA | BA/MMA | | | | |
| | | Glass transition temperature (° C.) | −39/106 | −39/106 | −39/106 | — | — | — | — |
| | | Primary particle size (μm) | 0.4 | 0.4 | 0.4 | — | — | — | — |
| | | Secondary particle size (μm) | 3 | 3 | 3 | — | — | — | — |
| | | Content (% by mass) | 10 | 10 | 10 | — | — | — | — |
| | EVOH (A) | Type | EVOH-1 | EVOH-1 | EVOH-1 | EVOH-1 | EVOH-2 | EVOH-3 | PA6 |
| | | Ethylene content (mol %) | 32 | 32 | 32 | 32 | 27 | 44 | 32 |
| | | Content (% by mass) | 90 | 90 | 90 | 100 | 100 | 100 | 90 |
| Pipe | Outer tube | Thickness (mm) | 6 | — | — | 6 | 6 | 6 | 6 |
| | Inner tube | Thickness (mm) | 6 | 6 | 12 | 6 | 6 | 6 | 6 |
| | | Thickness ratio (Resin composition layer/Inner tube) | 0.01 | 0.03 | 0.03 | 0.03 | 0.03 | 0.03 | 0.03 |
| | Whole | Thickness ratio (Outer tube/Inner tube) | 1 | — | — | 1 | 1 | 1 | 1 |
| Property evaluation | | Barrier properties | C | A | A | A | A | B | C |
| | | Flattening strength | A | C | A | A | A | A | A |
| | | Barrier properties after deformation | A | C | C | C | C | C | C |

*[1]Maleic-anhydride modified ethylene-butene copolymer ("Tafmer MH7020" Manufactured by Mitsui Chemicals Inc.)
*[2]Polyurethane ("ET890" manufactured by BASF)
*[3]Maleic-anhydride modified styrene-ethylene/butylene-styrene block copolymer ("Tuftec M1943" Manufactured by Asahi Kasei Corporation)

The invention claimed is:

1. A fuel pipe comprising a double tube comprising an inner tube and an outer tube disposed on the outside of the inner tube, wherein
the inner tube comprises a layer made of a resin composition containing an ethylene-vinyl alcohol copolymer (A) and an elastomer (B), and a layer made of a polyethylene;
the outer tube comprises a layer made of a polyethylene;
a thickness of the inner tube is 5 mm or more, and a ratio of a thickness of the layer made of the resin composition to a thickness of the inner tube (resin composition layer/inner tube) is 0.02 to 0.2; and
a ratio of a thickness of the outer tube to a thickness of the inner tube (outer tube/inner tube) is 0.1 to 5.

2. The fuel pipe according to claim 1, wherein the elastomer (B) is at least one selected from the group consisting of an acrylic elastomer, an olefinic elastomer, a urethane elastomer, a styrenic elastomer and a conjugated-diene elastomer.

3. The fuel pipe according to claim 1, wherein the resin composition comprises multilayer structured polymer particles as the elastomer (B).

4. The fuel pipe according to claim 3, wherein an average primary particle size of the multilayer structured polymer particles is 0.2 to 1 μm.

5. The fuel pipe according to claim 3, wherein an average secondary particle size of the multilayer structured polymer particles is 1.1 to 10 μm.

6. The fuel pipe according to claim 3, wherein the multilayer structured polymer particles have at least an outermost layer and an innermost layer.

7. The fuel pipe according to claim 6, wherein a glass transition temperature of a polymer component constituting the outermost layer is 30° C. or higher, and a glass transition temperature of a polymer component constituting the innermost layer is −10° C. or lower.

8. The fuel pipe according to claim 1, wherein an ethylene content of the ethylene-vinyl alcohol copolymer (A) is 20 to 50 mol %.

9. The fuel pipe according to claim 1, wherein a mass ratio (B/A) of the elastomer (B) to the ethylene-vinyl alcohol copolymer (A) is 1/99 to 40/60.

10. A fuel pipe for underground burial consisting of the fuel pipe according to claim 1.

11. A method for transporting fuel, comprising transporting fuel using the fuel pipe according to claim 1.

12. A method for transporting fuel, comprising burying the fuel pipe according to claim 10 in the ground, and then transporting fuel using the fuel pipe.

* * * * *